US008089918B2

(12) United States Patent
Someya

(10) Patent No.: US 8,089,918 B2
(45) Date of Patent: Jan. 3, 2012

(54) TIME INFORMATION RECEIVER AND RADIO CONTROLLED WATCH

(75) Inventor: Kaoru Someya, Kiyose (JP)

(73) Assignee: Casio Computer Co., Ltd., Tokyo (JP)

( * ) Notice: Subject to any disclaimer, the term of this patent is extended or adjusted under 35 U.S.C. 154(b) by 939 days.

(21) Appl. No.: 12/077,860

(22) Filed: Mar. 21, 2008

(65) Prior Publication Data

US 2008/0240076 A1 Oct. 2, 2008

(30) Foreign Application Priority Data

Mar. 26, 2007 (JP) ................................ 2007-079830

(51) Int. Cl.
*H04J 3/08* (2006.01)

(52) U.S. Cl. ....................................... 370/326; 370/350

(58) Field of Classification Search .................. 370/365, 370/326, 350
See application file for complete search history.

(56) References Cited

U.S. PATENT DOCUMENTS

| | | | | |
|---|---|---|---|---|
| 2003/0117901 | A1 | 6/2003 | Takada et al. | |
| 2005/0036514 | A1 | 2/2005 | Polonio et al. | |
| 2005/0094495 | A1 | 5/2005 | Takada et al. | |
| 2005/0195690 | A1* | 9/2005 | Kondo | 368/47 |
| 2006/0045212 | A1 | 3/2006 | Ishii et al. | |
| 2006/0067166 | A1 | 3/2006 | Murata et al. | |
| 2007/0115759 | A1 | 5/2007 | Sano | |
| 2007/0152900 | A1 | 7/2007 | Takada | |
| 2008/0239879 | A1 | 10/2008 | Someya | |

FOREIGN PATENT DOCUMENTS

| | | | |
|---|---|---|---|
| CN | 1741399 | A | 3/2006 |
| EP | 1 788 460 | A2 | 5/2007 |
| JP | 11-211858 | A | 8/1999 |
| JP | 2005-249632 | A | 9/2005 |
| WO | WO 2005/062137 | A1 | 7/2005 |

OTHER PUBLICATIONS

European Search Report dated Dec. 9, 2009 issued in counterpart European Application No. 08005380.4.

Chinese Office Action dated Nov. 27, 2009 and English translation thereof issued in a counterpart Chinese Application No. 2008100867514.

Related U.S. Appl. No. 12/077,859, filed Mar. 21, 2008; Inventor: Kaoru Someya; Title: Time Information Receiver and Radio Controlled Watch.

* cited by examiner

*Primary Examiner* — Kevin C Harper
*Assistant Examiner* — Sai-Ming Chan
(74) *Attorney, Agent, or Firm* — Holtz, Holtz, Goodman & Chick, PC

(57) ABSTRACT

A standard time and frequency signal receiver receives a time code in which a plurality of data pulses "1", "0" and "P" which are identified by width are arranged one in a respective one of unit periods of the standard signal. An amplitude of a detected signal of the time code is sampled with respect to a seconds synchronization point in a unit period. Then, correlation values F1, F0 and FP for the data pulses "P", "1" and "0", respectively, are calculated based on the sampled values. These correlation values F1, F0 and FP are then compared to determine the data pulse received. Even when the time code contains a considerable noise, which of the "1", "0" and "P" signals was received is determined accurately, thereby achieving the reception of the time code with a reduced error.

10 Claims, 18 Drawing Sheets

FIG.8

"1" SIGNAL:

| TIME | 0 | 0.1 | 0.2 | 0.3 | 0.4 | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 | 2.1 |
|---|---|---|---|---|---|---|---|---|---|---|---|---|---|---|---|---|---|---|---|---|---|---|
| VALUE | 1.500 | 1.193 | 2.108 | 0.961 | 1.503 | 0.905 | 0.235 | 0.584 | 0.127 | 1.063 | 1.612 | 0.457 | 2.389 | 1.752 | 0.700 | 0.655 | 0.839 | 0.809 | -0.439 | 0.628 | 2.745 | 0.329 |
| | | | | | | | | | | | p | 0.588 | | | | | | | | | p | 0.482 |
| | | | | | | | | | | | 1 | 0.970 | | | | | | | | | 1 | 0.908 |
| | | | | | | | | | | | 0 | 0.662 | | | | | | | | | 0 | 0.768 |

-CONTINUED

| 2.2 | 2.3 | 2.4 | 2.5 | 2.6 | 2.7 | 2.8 | 2.9 | 3 | 3.1 | 3.2 | 3.3 | 3.4 | 3.5 | 3.6 | 3.7 | 3.8 | 3.9 | | |
|---|---|---|---|---|---|---|---|---|---|---|---|---|---|---|---|---|---|---|---|
| 1.215 | 2.516 | 1.302 | 0.000 | 0.302 | 1.516 | 0.215 | -0.671 | 2.745 | 1.628 | 0.561 | 1.809 | 1.839 | 0.655 | -0.300 | 0.752 | 1.389 | -0.543 | | |
| | | | | | | | | p | 0.519 | | | | | | | | | p | 0.711 |
| | | | | | | | | 1 | 1.043 | | | | | | | | | 1 | 1.020 |
| | | | | | | | | 0 | 0.731 | | | | | | | | | 0 | 0.539 |

FIG.9

"0" SIGNAL:

| TIME | 0 | 0.1 | 0.2 | 0.3 | 0.4 | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 | 2.1 |
|---|---|---|---|---|---|---|---|---|---|---|---|---|---|---|---|---|---|---|---|---|---|---|
| VALUE | 1.500 | 1.193 | 2.108 | 0.961 | 1.503 | 1.905 | 1.235 | 1.584 | 0.127 | 1.603 | 1.612 | 0.457 | 2.389 | 1.752 | 0.700 | 1.655 | 1.839 | 1.809 | -0.439 | 0.628 | 2.745 | 0.329 |
| | | | | | | | | | | | p | 0.213 | | | | | | | | | p | 0.107 |
| | | | | | | | | | | | 1 | 0.370 | | | | | | | | | 1 | 0.308 |
| | | | | | | | | | | | 0 | 1.037 | | | | | | | | | 0 | 1.143 |

-CONTINUED

| 2.2 | 2.3 | 2.4 | 2.5 | 2.6 | 2.7 | 2.8 | 2.9 | 3 | 3.1 | 3.2 | 3.3 | 3.4 | 3.5 | 3.6 | 3.7 | 3.8 | 3.9 | | |
|---|---|---|---|---|---|---|---|---|---|---|---|---|---|---|---|---|---|---|---|
| 1.215 | 2.516 | 1.302 | 1.000 | 1.302 | 2.516 | 0.215 | -0.671 | 2.745 | 1.628 | 0.561 | 1.809 | 1.839 | 1.655 | 0.700 | 1.752 | 1.389 | -0.543 | | |
| | | | | | | | | p | 0.144 | | | | | | | | | p | 0.336 |
| | | | | | | | | 1 | 0.443 | | | | | | | | | 1 | 0.420 |
| | | | | | | | | 0 | 1.106 | | | | | | | | | 0 | 0.914 |

FIG.10

"P" SIGNAL:

| TIME | 0 | 0.1 | 0.2 | 0.3 | 0.4 | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 | 2.1 |
|---|---|---|---|---|---|---|---|---|---|---|---|---|---|---|---|---|---|---|---|---|---|---|
| VALUE | 1.500 | 1.193 | 1.108 | -0.039 | 0.503 | 0.905 | 0.235 | 0.584 | 0.127 | 1.063 | 1.612 | 0.457 | 1.389 | 0.752 | -0.300 | 0.655 | 0.839 | 0.809 | -0.439 | 0.628 | 2.745 | 0.329 |
| | | | | | | | | | | | p | 0.963 | | | | | | | | | p | 0.857 |
| | | | | | | | | | | | 1 | 0.370 | | | | | | | | | 1 | 0.308 |
| | | | | | | | | | | | 0 | 0.287 | | | | | | | | | 0 | 0.393 |

-CONTINUED

| 2.2 | 2.3 | 2.4 | 2.5 | 2.6 | 2.7 | 2.8 | 2.9 | 3 | 3.1 | 3.2 | 3.3 | 3.4 | 3.5 | 3.6 | 3.7 | 3.8 | 3.9 | | |
|---|---|---|---|---|---|---|---|---|---|---|---|---|---|---|---|---|---|---|---|
| 0.215 | 1.516 | 0.302 | 0.000 | 0.302 | 1.516 | 0.215 | -0.671 | 2.745 | 1.628 | -0.439 | 0.809 | 0.839 | 0.655 | -0.300 | 0.752 | 1.389 | -0.543 | | |
| | | | | | | | | p | 0.894 | | | | | | | | | p | 1.086 |
| | | | | | | | | 1 | 0.443 | | | | | | | | | 1 | 0.420 |
| | | | | | | | | 0 | 0.356 | | | | | | | | | 0 | 0.164 |

FIG.11

"1" SIGNAL:

| TIME | 0 | 0.1 | 0.2 | 0.3 | 0.4 | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 | 2.1 |
|---|---|---|---|---|---|---|---|---|---|---|---|---|---|---|---|---|---|---|---|---|---|---|
| VALUE | 1.500 | 1.193 | 2.108 | 0.961 | 1.503 | 0.905 | 0.235 | 0.584 | 0.127 | 1.063 | 1.612 | 0.457 | 2.389 | 1.752 | 0.700 | 0.655 | 0.839 | 0.809 | -0.439 | 0.628 | 2.745 | 0.329 |
| CORRECTED | 1.500 | 1.193 | 2.000 | 0.961 | 1.503 | 0.905 | 0.235 | 0.584 | 0.127 | 1.063 | 1.612 | 0.457 | 2.000 | 1.752 | 0.700 | 0.655 | 0.839 | 0.809 | 0.000 | 0.628 | 2.000 | 0.329 |
| | | | | | | | | | | | p | 0.602 | | | | | | | | | p | 0.531 |
| | | | | | | | | | | | 1 | 0.948 | | | | | | | | | 1 | 0.830 |
| | | | | | | | | | | | 0 | 0.648 | | | | | | | | | 0 | 0.719 |

-CONTINUED

| 2.2 | 2.3 | 2.4 | 2.5 | 2.6 | 2.7 | 2.8 | 2.9 | 3 | 3.1 | 3.2 | 3.3 | 3.4 | 3.5 | 3.6 | 3.7 | 3.8 | 3.9 | | |
|---|---|---|---|---|---|---|---|---|---|---|---|---|---|---|---|---|---|---|---|
| 1.215 | 2.516 | 1.302 | 0.000 | 0.302 | 1.516 | 0.215 | -0.671 | 2.745 | 1.628 | 0.561 | 1.809 | 1.839 | 0.655 | -0.300 | 0.752 | 1.389 | -0.543 | | |
| 1.215 | 2.000 | 1.302 | 0.000 | 0.302 | 1.516 | 0.215 | 0.000 | 2.000 | 1.628 | 0.561 | 1.809 | 1.839 | 0.655 | 0.000 | 0.752 | 1.389 | 0.000 | | |
| | | | | | | | | p | 0.583 | | | | | | | | | p | 0.673 |
| | | | | | | | | 1 | 0.940 | | | | | | | | | 1 | 0.961 |
| | | | | | | | | 0 | 0.667 | | | | | | | | | 0 | 0.577 |

FIG.12

"0" SIGNAL:

| TIME | 0 | 0.1 | 0.2 | 0.3 | 0.4 | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 | 2.1 |
|---|---|---|---|---|---|---|---|---|---|---|---|---|---|---|---|---|---|---|---|---|---|---|
| VALUE | 1.500 | 1.193 | 2.108 | 0.961 | 1.503 | 1.905 | 1.235 | 1.584 | 0.127 | 1.063 | 1.612 | 0.457 | 2.389 | 1.752 | 0.700 | 1.655 | 1.839 | 1.809 | -0.439 | 0.628 | 2.745 | 0.329 |
| CORRECTED | 1.500 | 1.193 | 2.000 | 0.961 | 1.503 | 1.905 | 1.235 | 1.584 | 0.127 | 1.063 | 1.612 | 0.457 | 2.000 | 1.752 | 0.700 | 1.655 | 1.839 | 1.809 | 0.000 | 0.628 | 2.000 | 0.329 |
| | | | | | | | | | | | p | 0.227 | | | | | | | | | p | 0.156 |
| | | | | | | | | | | | 1 | 0.348 | | | | | | | | | 1 | 0.230 |
| | | | | | | | | | | | 0 | 1.023 | | | | | | | | | 0 | 1.094 |

-CONTINUED

| 2.2 | 2.3 | 2.4 | 2.5 | 2.6 | 2.7 | 2.8 | 2.9 | 3 | 3.1 | 3.2 | 3.3 | 3.4 | 3.5 | 3.6 | 3.7 | 3.8 | 3.9 | | |
|---|---|---|---|---|---|---|---|---|---|---|---|---|---|---|---|---|---|---|---|
| 1.215 | 2.516 | 1.302 | 1.000 | 1.302 | 2.516 | 0.215 | -0.671 | 2.745 | 1.628 | 0.561 | 1.809 | 1.839 | 1.655 | 0.700 | 1.752 | 1.389 | -0.543 | | |
| 1.215 | 2.000 | 1.302 | 1.000 | 1.302 | 2.000 | 0.215 | 0.000 | 2.000 | 1.628 | 0.561 | 1.809 | 1.839 | 1.655 | 0.700 | 1.752 | 1.389 | 0.000 | | |
| | | | | | | | | p | 0.273 | | | | | | | | | p | 0.336 |
| | | | | | | | | 1 | 0.443 | | | | | | | | | 1 | 0.420 |
| | | | | | | | | 0 | 0.977 | | | | | | | | | 0 | 0.914 |

FIG.13

"P" SIGNAL:

| TIME | 0 | 0.1 | 0.2 | 0.3 | 0.4 | 0.5 | 0.6 | 0.7 | 0.8 | 0.9 | 1 | 1.1 | 1.2 | 1.3 | 1.4 | 1.5 | 1.6 | 1.7 | 1.8 | 1.9 | 2 | 2.1 |
|---|---|---|---|---|---|---|---|---|---|---|---|---|---|---|---|---|---|---|---|---|---|---|
| VALUE | 1.500 | 1.193 | 2.108 | -0.039 | 0.503 | 0.905 | 0.235 | 0.584 | 0.127 | 1.063 | 1.612 | 0.457 | 2.389 | 0.752 | -0.300 | 0.655 | 0.839 | 0.809 | -0.439 | 0.628 | 2.745 | 0.329 |
| CORRECTED | 1.500 | 1.193 | 2.000 | 0.000 | 0.503 | 0.905 | 0.235 | 0.584 | 0.127 | 1.063 | 1.612 | 0.457 | 2.000 | 0.752 | 0.000 | 0.655 | 0.839 | 0.809 | 0.000 | 0.628 | 2.000 | 0.329 |

| | |
|---|---|
| p | 0.847 |
| 1 | 0.556 |
| 0 | 0.403 |

| | |
|---|---|
| p | 0.743 |
| 1 | 0.490 |
| 0 | 0.507 |

-CONTINUED

| 2.2 | 2.3 | 2.4 | 2.5 | 2.6 | 2.7 | 2.8 | 2.9 | 3 | 3.1 | 3.2 | 3.3 | 3.4 | 3.5 | 3.6 | 3.7 | 3.8 | 3.9 |
|---|---|---|---|---|---|---|---|---|---|---|---|---|---|---|---|---|---|
| 1.215 | 1.516 | 0.302 | 0.000 | 0.302 | 1.516 | 0.215 | -0.671 | 2.745 | 1.628 | 0.561 | 0.809 | 0.839 | 0.655 | -0.300 | 0.752 | 1.389 | -0.543 |
| 1.215 | 1.516 | 0.302 | 0.000 | 0.302 | 1.516 | 0.215 | 0.000 | 2.000 | 1.628 | 0.561 | 0.809 | 0.839 | 0.655 | 0.000 | 0.752 | 1.389 | 0.000 |

| | |
|---|---|
| p | 0.769 |
| 1 | 0.643 |
| 0 | 0.481 |

| | |
|---|---|
| p | 0.923 |
| 1 | 0.561 |
| 0 | 0.327 |

FIG.19

| TABLE 1 | | |
|---|---|---|
| SUPPOSED SIGNAL | DETECTION TIME (SEC) | CALC. EXPRESSION |
| "P" OR "M" SIGNAL | 0.4+CALC. DELAY | (S0+S1)/2-(S2+S3)/2 |
| "1" SIGNAL | 0.7+CALC. DELAY | (S3+S4)/2-(S5+S6)/2 |
| "0" SIGNAL | 1.0+CALC. DELAY | (S6+S7)/2-(S8+S9)/2 |

FIG.20

| TABLE 2 | | |
|---|---|---|
| SUPPOSED SIGNAL | DETECTION TIME (SEC) | CALC. EXPRESSION |
| "P" OR "M" SIGNAL | 1.0+CALC. DELAY | $(S0+S1)/2-(\sum_{n=2}^{9} Sn)/8$ |
| "1" SIGNAL | 1.0+CALC. DELAY | $(\sum_{n=0}^{4} Sn)/5-(\sum_{n=5}^{9} Sn)/5$ |
| "0" SIGNAL | 1.0+CALC. DELAY | $(\sum_{n=0}^{7} SnS)/8-(S8+S9)/2$ |

FIG.21

| TABLE 3 | | |
|---|---|---|
| SUPPOSED SIGNAL | DETECTION TIME (SEC) | CALC. EXPRESSION |
| "P" OR "M" SIGNAL | 0.4+CALC. DELAY | a-(S2+S3)/2 |
| "1" SIGNAL | 0.7+CALC. DELAY | (S3+S4)/2-(S5+S6)/2 |
| "0" SIGNAL | 1.0+CALC. DELAY | (S6+S7)/2-b |

FIG.22

| TABLE 4 | | |
|---|---|---|
| SUPPOSED SIGNAL | DETECTION TIME (SEC) | CALC. EXPRESSION |
| "P" OR "M" SIGNAL | 1.0+CALC. DELAY | $a-(\sum_{n=2}^{7} Sn+2b)/8$ |
| "1" SIGNAL | 1.0+CALC. DELAY | $(2a+\sum_{n=2}^{4} Sn)/5-(\sum_{n=5}^{7} Sn+2b)/5$ |
| "0" SIGNAL | 1.0+CALC. DELAY | $(2a+\sum_{n=2}^{7} Sn)/8-b$ |

TIME INFORMATION RECEIVER AND RADIO CONTROLLED WATCH

FIELD OF THE INVENTION

The present invention relates to time information receivers that receive time code carried by a standard time and frequency signal, and radio controlled watches that correct their times based on the time code.

BACKGROUND ART

Radio controlled watches are known in the past which receive a time code signal to correct their times. The time code has a predetermined format of successive frames of 60 seconds with each frame including 60 data pulses one occurring in a unit period of 1 second. The time code now in use in Japan includes a "P" signal that is high for 0.2 seconds from a start of a unit period, a "0" signal that is high for 0.5 seconds from a start of a unit period, and a "1" signal that is high for 0.8 seconds from a start of a unit period. Among these signals, the "P" signal is defined as a frame marker which indicates a start of each of the frames of the time code and serves also as a position marker which indicates each of divisions of data such as minutes, hours, day and year. Moreover, the "0" and "1" signals represent binary "0" and "1", respectively, which can be applied to a time code format, thereby calculating a current exact time and date represented in minutes, hours, day, month, and year. The seconds is represented by a time point of a rise of each data pulse.

The time code, for example, AM-modulated, is carried by the standard signal, which is of 40 or 60 kHz, but a clear signal waveform indicative of the time code is difficult to receive due to diffused reflections/attenuations in buildings and mixing of turbulent noise. Especially, in the reception of the time code, about four frames or four-minute data of the time code is usually received to avoid wrong recognition of the time code. It is, however, difficult to continue to receive its clear signal throughout this duration time.

In the past, some propositions have been made which try to determine the time code accurately from the standard time and frequency signal even when the same contains noise. For example, Japanese Patent Application TOKKAIHEI 11-211858 discloses a technology that detects at intervals of 0.1 seconds whether the received signal is high or low, and determines a data pulse included in the signal, using its binarized data.

In the above-mentioned time code receiving and data pulse determining methods and when the detected signal contains a little noise, its data pulse is detectable from the binarized data of the detected signal. However, if the detected signal contains a considerable noise, the data pulse cannot be determined correctly.

An object of the present invention is to provide a time information receiver and radio controlled watch capable of determining a received data pulse accurately from the time code even when the same contains a considerable noise.

SUMMARY OF THE INVENTION

In one aspect of the present invention, the above object is achieved by a time information receiver which receives a time code in which a plurality of different data pulses identified by width or pattern are arranged one in a respective one of unit periods of the time code. The time information receiver comprises a sampler that samples a detected signal of the time code; calculating means for calculating a correlation value for each of the plurality of data pulses of the detected signal based on the sampled data obtained from the sampler; and a determiner that determines which of the plurality of data pulses of the detected signal was received based on the correlation values calculated by the calculating means.

According to the present invention, the detected signal is sampled, a correlation value for a respective one of the data pulses is calculated from the sampled data, and the data pulse received is determined from the correlation values. Thus, even when the time code contains a considerable noise, the data pulse received is determined correctly.

BRIEF DESCRIPTION OF THE DRAWINGS

Additional advantages and features of the present invention will become apparent from the subsequent description and the appended claims, taken in conjunction with the accompanying drawings, wherein:

FIG. 8 shows a first example of the result of simulation of determination of a "1" signal containing noise;

FIG. 9 shows a first example of the result of simulation of determination of a "0" signal containing noise;

FIG. 10 shows a first example of the result of simulation of determination of a "P" signal containing noise;

FIG. 11 shows a second example of the result of simulation of determination of a "1" signal containing noise;

FIG. 12 shows a second example of the result of simulation of determination of a "0" signal containing noise;

FIG. 13 shows a second example of the result of simulation of determination of a "P" signal containing noise;

FIG. 19 shows Table 1 indicative of a first group of correlation value calculation expressions;

FIG. 20 shows Table 2 indicative of a second group of correlation value calculation expressions;

FIG. 21 shows Table 3 indicative of a third group of correlation value calculation expressions; and FIG. 22 shows Table 4 indicative of a second group of correlation value calculation expressions.

DETAILED DESCRIPTION OF THE INVENTION

First Embodiment

Figure 1:
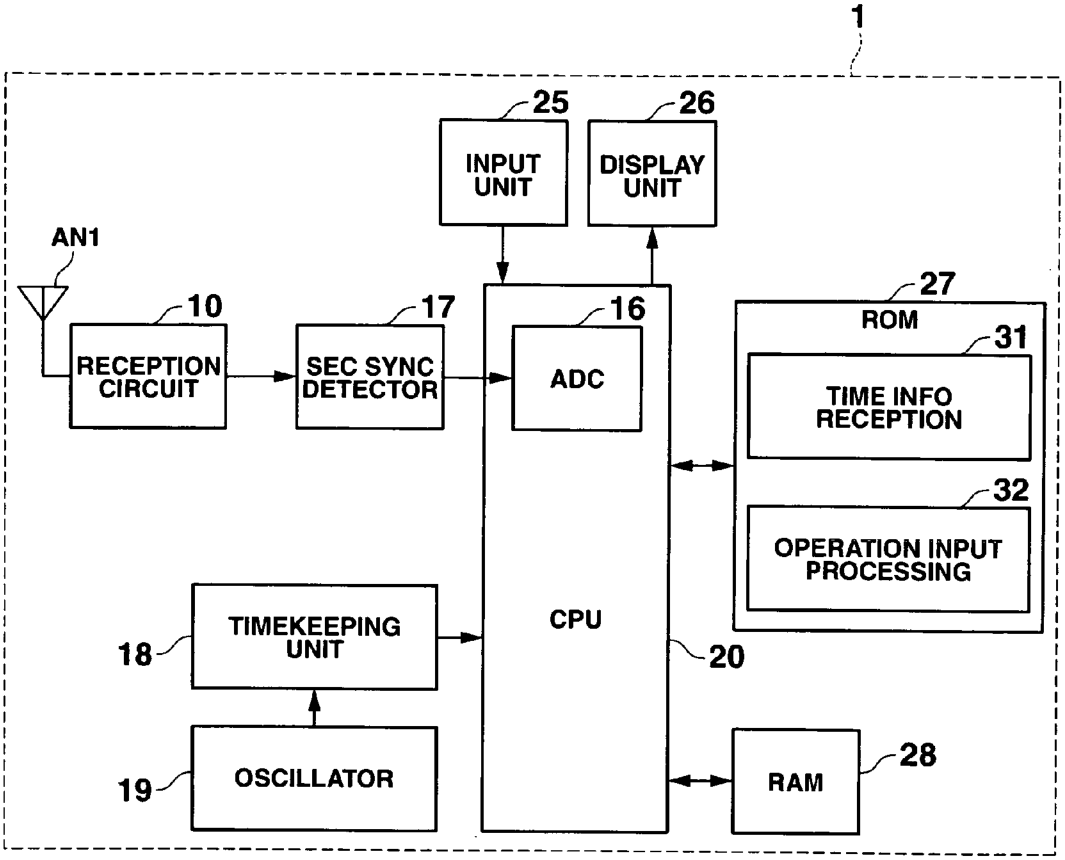
FIG. 1 is a block diagram of a radio controlled watch according to a first embodiment of the present invention.

Referring to FIG. 1, there is shown a radio controlled watch 1 of a first embodiment of the present invention. The watch 1 includes a time information receiver which receives a standard time and frequency signal where the time codes are included and which corrects the time thereof automatically. The watch 1 comprises an internal antenna AN1 that receives the standard time and frequency signal, a reception circuit 10 that processes the received standard signal, an A/D converter 16 that samples a signal value (for example, amplitude) of a detected signal from the reception circuit 10, a seconds synchronization detector 17 that when receiving a clear waveform of the time code containing little noise, detects a time point in the waveform, where each of data pulses in the time code rises, as a seconds synchronization point, a timekeeping circuit 18, an oscillator 19 that provides clock pulses to the timekeeping circuit 18, a CPU (microcomputer) 20 that controls the whole of the watch 1, an input unit 25 that inputs operation signals generated by operation button switches (not shown) to the microcomputer 20, a display 26 that displays time based on time data from the timekeeping circuit 18, a ROM 27 that has stored control programs and control data, and a RAM 28 which provides a working memory space for the CPU 20. The reception circuit 10, A/D converter 16, CPU 20, ROM 27 and RAM 28 compose the time information receiver.

The control programs stored in the ROM 27 include a time information reception program 31 which receives the received standard signal and corrects the time of the watch based on the time code of the standard signal and an operation input processing program 32 which executes various functions based on operation signals from the input unit 25.

Figure 2:
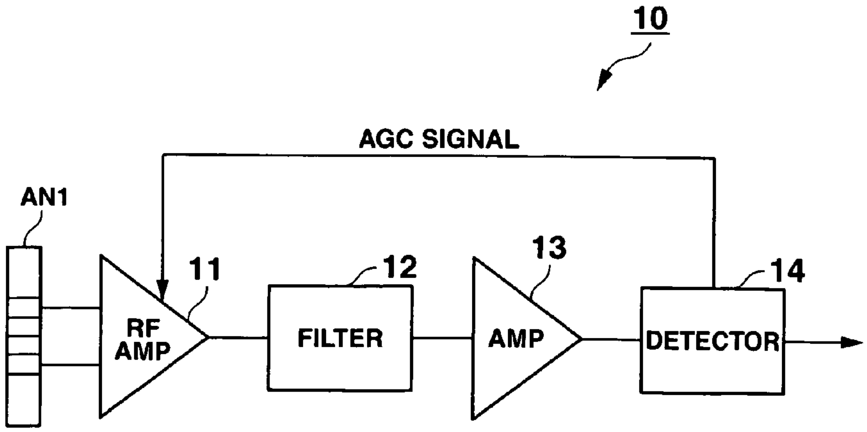
FIG. 2 shows a composition of a reception circuit of the watch.

FIG. 2 shows the composition of the reception circuit 10 of FIG. 1, which comprises an RF amplifier 11 that amplifies the signal received by the antenna AN1 while controlling its gain, a band-pass filter 12 that allows signals of the frequency band of the standard signal to pass therethrough, an amplifier 13 that amplifies the signals that have passed through the filter 12, and a detector 14 that demodulates a time code signal from the output of the amplifier 13. The detector 14 sends a gain control (AGC) signal to the RF amplifier 11 to keep the amplitude of the detected signal to be constant.

Figure 3:
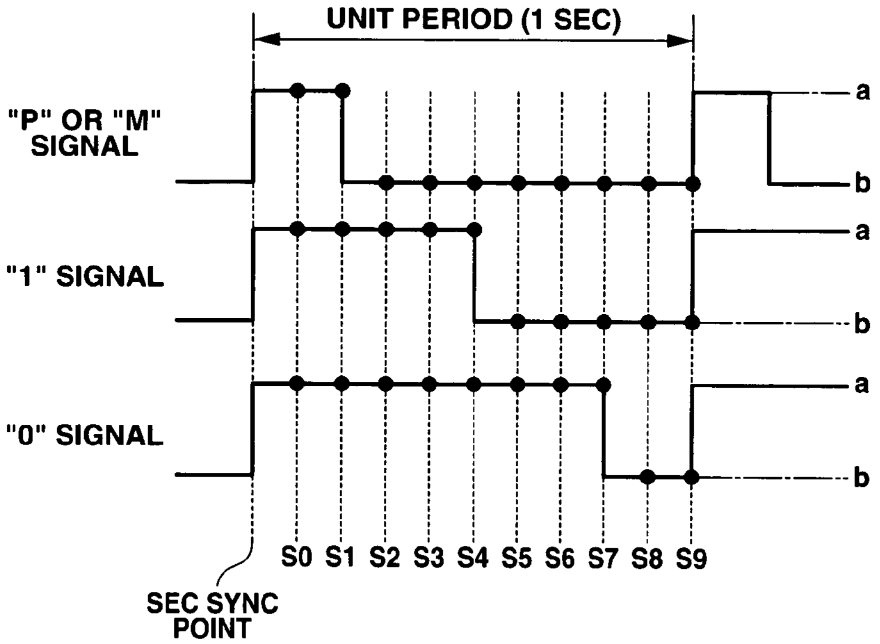
FIG. 3 shows one specified example of ideal signal waveforms of data pulses contained in the time code and sample points on the waveform.

FIG. 3 illustrates ideal signal waveforms of data pulses included in the time code and an example of time points where data pulses are sampled by the A/D converter 16. The data pulses include a “P” (position marker) signal (which can represent the “P” signal as well as an M (frame marker) signal), and “1” and “0” signals.

The A/D converter 16 performs an A/D converting operation on the detected signal outputted from the reception circuit 10 at a predetermined sampling rate, for example, of 10 times per second, thereby sampling the amplitude of the detected signal. The A/D converter 16 preferably has an output resolution, for example, of 4 or more bits. In the time code, a unit period in which one data pulse is disposed is, for example, 1 second. Thus, a single data pulse is sampled at time points in a unit period, thereby providing sampled data. Sampling of the detected signal at all the time points within the entire unit period is not required, but may be performed only at points within the unit period required for calculation of a correlation value to be described later.

Sampling of the detected signal by the A/D converter 16 is controlled so as to be performed at set intervals of time from a start point of a unit period of the time code (or seconds synchronization point) when each of “P”, “0” and “1” signals rises. As shown in FIG. 3, according to this arrangement the detected signal from the reception circuit 10 is sampled at intervals of 0.1 seconds (at sample points S0-S9) from the seconds synchronization point and outputted to the CPU 20.

Several examples of a method of calculating correlation values for data pulses (“P”, “M”, “1” and “0” signals) which is performed by the CPU 20 to determine the received data pulse will be described next. In the reception circuit 10, it is assumed that its reception signal band is narrow and high frequency noise is not contained in the detected signal, but considerable noises of lower frequencies of less than 10 Hz are contained. Thus, by sampling the detected signal at 0.1 Hz and adding up resulting sampled values, the lower frequency noises are averaged and eliminated. By taking a difference between sampled values before and after a fall point of a data pulse, a correlation value from which each data pulse is determined is obtained. Several examples of a method of calculating the correlation value will be described next.

(First Group of Correlation Value Calculation Methods)

Referring to Table 1 shown in FIG. 19, there is shown a first group of correlation value calculation methods for the “P”, “1” and “0” signals. These methods involve taking a difference between a composite value (for example, an averaged value) of two successive sampled values of a data pulse of the detected signal immediately before a fall point of the data pulse to be determined and that of two successive sampled values of the data pulse immediately after the fall point, thereby handling it as a correlation value for the data pulse. That is, the respective calculations are performed on the “P”, “1” and “0” signals in accordance with the calculation expressions of Table 1, thereby obtaining corresponding correlation values for the “P”, “1” and “0” signals. A signal corresponding to a maximum one of the three correlation values is determined as the received data pulse.

For example, when a “1” signal having an ideal waveform is received, its correlation value is given by $(S3+S4)-(S5+S6)=2a-2b$ (see FIG. 3). A correlation value for a possible “P” signal having an ideal waveform is given by $(S3+S4)-(S5+S6)=2b-2b=0$. A correlation value for a possible “0” signal having an ideal waveform is represented by $(S3+S4)-(S5+S6)=2a-2a=0$. Thus, in the correlation value calculation for the “1” signal, a larger correlation value is obtained when the “1” signal is received, and smaller correlation values when other signals are received. Even in the correlation value calculations for the “P” and “0” signals, similar results are obtained. Thus, by comparing these correlation values, it is accurately determined which signal was received. An influence of lower frequency noises contained in the data pulses on the correlation values is reduced because noises at the four sample points are added and averaged. According to this method, the times required for calculating the correlation values for the “P”, “1” and “0” signals are shown in Table 1.

(Second Groups of Correlation Value Calculation Methods)

Referring to Table 2 shown in FIG. 20, there is shown a second group of correlation value calculation methods for the “P”, “1” and “0” signals. The second group of calculation methods involves determining a data pulse received, by taking a difference between an averaged value of amplitudes of the detected signal high throughout a part of a unit period and an averaged value of amplitudes of the detected signal low throughout another part of the unit period, using not only data values before and after the fall point of the pulse, but also all sampled data in that period of the signal. That is, the correlation values for the respective “P”, “1” and “0” signals of the received detected signal are calculated in accordance with the corresponding expressions of Table 2, using the sampled data of the received detected signal. The signal corresponding to a maximum one of the three correlation values for the respective “P”, “1” and “0” signals is determined as the received data pulse.

According to these methods, the correlation value for the “1” signal is larger when the “1” signal is received and smaller when the “P” or “0” signal is received. This applies to the correlation value for the “P” or “0” signal when the same is received. Thus, by comparing these correlation values, it is determined which signal was received. The influence of low frequency noises contained in the data pulses on the correlation values is reduced because noises sampled at 10 points are added and averaged. The times required for calculating these correlation values are shown in Table 2.

<Third Group of Correlation Value Calculation Methods>

Figure 4:
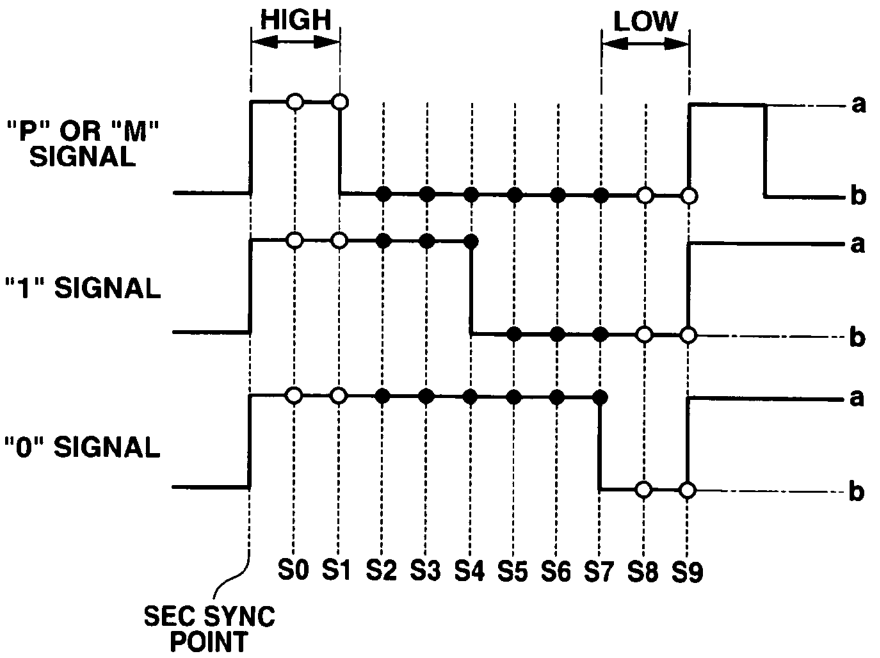
FIG. 4 illustrates the features of third and fourth examples of methods of calculating correlation values for the respective data pulses.

Referring to Table 3 shown in FIG. 21, there is shown a third group of correlation value calculation methods for the “P”, “1” and “0” signals. The third group of methods are used when all the data pulses (“P”, “1” and “0” signals) to be determined are high throughout a part of a unit period of 1 second, and low throughout another part of the unit period, as shown in FIG. 4. The third group of methods are obtained by modifying the first group of methods shown in Table 1 such that sampled high and low data values of each of the data pulses in those parts of the unit period are replaced with constant high and low values “a” and “b”, respectively, of a corresponding ideal data pulse such as shown in FIG. 4.

<Fourth Group of Correlation Value Calculation Methods>

Referring to Table 4 shown in FIG. 22, there is shown a fourth group of correlation value calculation methods for the “P”, “1” and “0” signals. These methods are used under the same conditions as when the third group of methods are used. The fourth group of methods are obtained by modifying the second group of methods shown in Table 2 such that, as in the case of the third group of methods, sampled high and low data values of each of the data pulses in those parts of the unit period are replaced with constant high and low values “a” and “b”, respectively, of a corresponding ideal data pulse such as shown in FIG. 4.

According to the third and fourth groups of calculation methods, when all the data pulses to be determined have the same level throughout a particular part of a unit period, the ideal constant data value is applied to the calculation expressions, thereby calculating their respective correlation values. Thus, noises which would otherwise influence the calculations adversely are eliminated and the accuracy with which the received data pulse is determined is improved. For the part of the unit period throughout which all the data pulses are high or low, data sampling by the A/D converter 16 can be stopped to save the power consumption.

A method of determining a data pulse of a time code to be performed by the CPU 20 based on the correlation value calculations will be described with reference to FIG. 5. When a predetermined start time comes, the time information reception process is started by the CPU 20. First, a rise point of each of data pulses of the time code is detected based on an output from the seconds synchronization detector 17 (step J1) and the seconds synchronization is calibrated based on the rise point of the data pulse (step J2). Thus, the seconds data of the timekeeping circuit 18 is synchronized with the time code. Further, a reference point with reference to which the data is sampled in the A/D converter 16 is set at the seconds synchronization point of the time code. Thus, sampling in the A/D converter 16 will be performed accurately at intervals of 0.1 seconds from the seconds synchronization point of the time code.

These operations in steps J1 and J2 are not necessarily required to be performed at the start of the time information reception process. The seconds synchronization detector 17 can detect the seconds synchronization if a clear-waveform time code signal is received for a short period. Thus, the operations in steps J1 and J2 may be performed in a duration time in which the clear signal can be received and the calibration of the seconds synchronization performed at that time may be used as it stands when a predetermined start time to receive the time code comes, thereby starting operation starting with step J3 of FIG. 5.

After the seconds synchronization is calibrated, a subroutine is performed which includes determining a respective one of data pulses received one in a unit period of 1 second (step J3). This process is repeated, for example, for four frames (or four minutes) of the time code (step J4).

Thereafter, a current time is calculated in accordance with a predetermined format from the time code thus obtained (step J5), and the time data of the timekeeping circuit 18 is corrected (step J6). Thus, the time information reception process is terminated. Alternatively, only one frame of the time code may be received instead of the four frames. When only minutes and seconds data are corrected, only a part of the time code in a range in which the minutes and seconds are indicated may be received.

Figure 5:
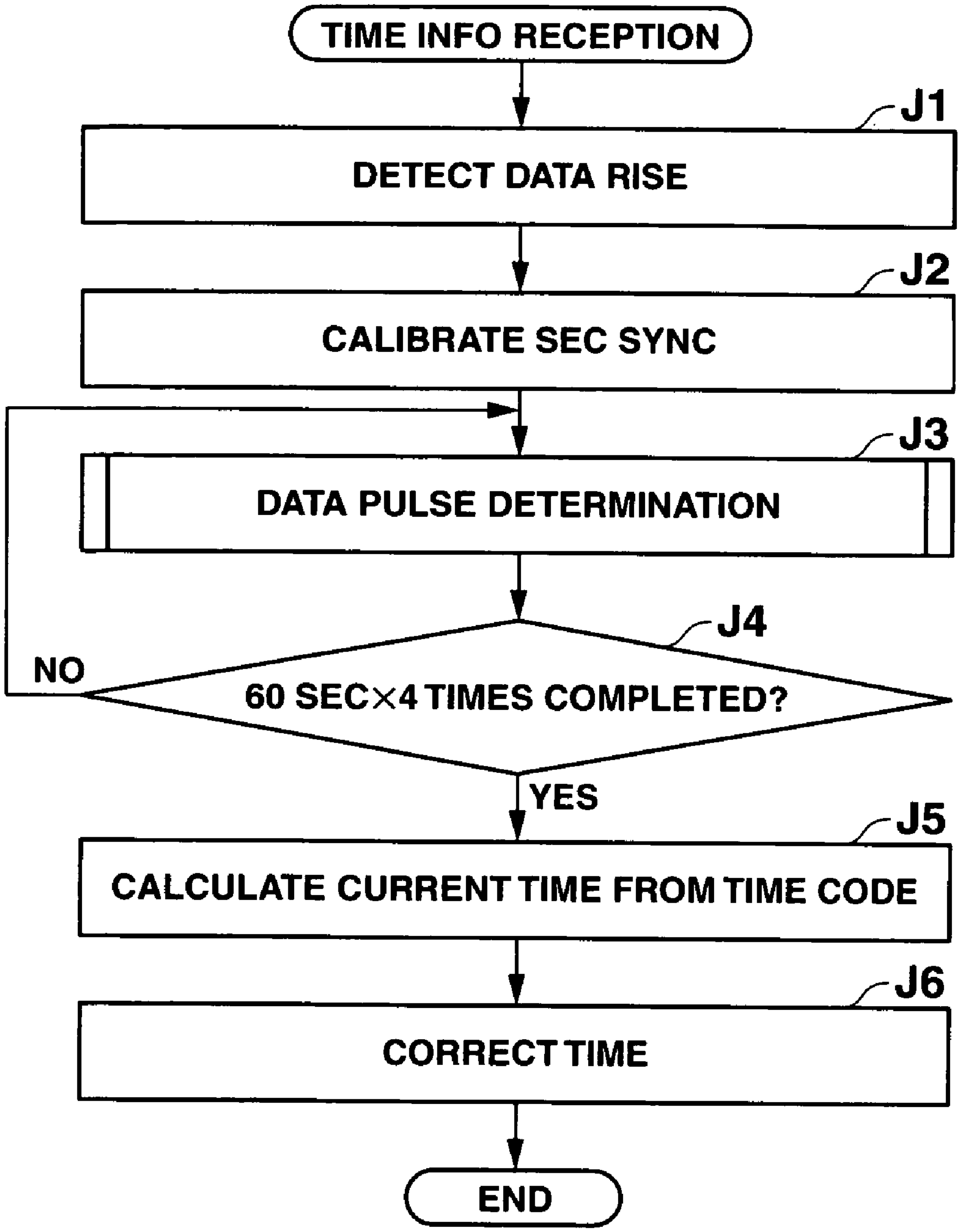
FIG. 5 is a flowchart of a time information reception process which is executed by a CPU (Central Processing Unit) of the watch.
Figure 6:
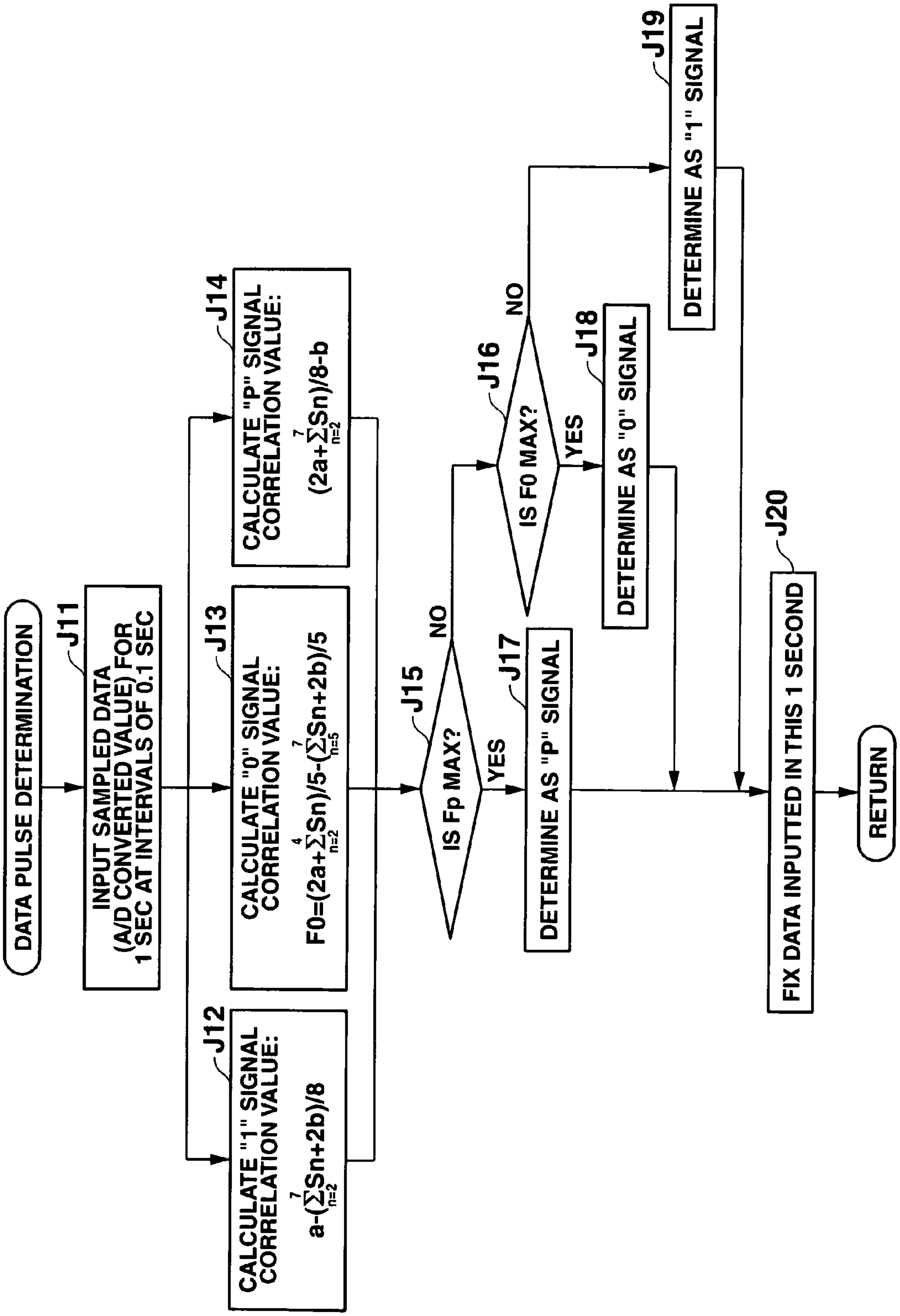
FIG. 6 illustrates a flowchart of a data pulse determining process which is performed in step J3 of FIG. 5.

Referring to FIG. 6, there is shown a flowchart of the data pulse determining subroutine to be performed in step J3 of FIG. 5. When this subroutine starts, first, an output from the A/D converter 16 is inputted for 1 second to the CPU 20 (step J11). Then, correlation values F1, F0 and FP of data pulses (or “1”, “0” and “P” signals) to be determined are calculated (steps J12-J14). The correlation values shown in this flowchart are obtained by using the fourth group of calculation methods mentioned above, but the first-third groups of calculation methods may be used instead.

After the correlation values F1, F0 and FP are calculated, these values are compared (steps J15, J16) and then the pulse signal having a maximum correlation value is determined as the received data pulse (steps J17-J19). That is, if FP is maximum, the “P” signal is determined as received; if F0 is maximum, the “0” signal is determined as received; and if F1 is maximum, the “1” signal is determined as received. Then, this determined signal is fixed as inputted in this unit period of 1 second (step J20). Then, this subroutine is terminated and the operation returns to the main routine.

Thus, even when a considerable noise is contained in the time code received, the “P”, “1” and “0” signals are determined accurately in these methods, thereby allowing the time code with little reception error to be received. Therefore, accurate time correction is achieved even under an environment where the reception situation of the standard time and frequency signal is bad.

Figure 7A:
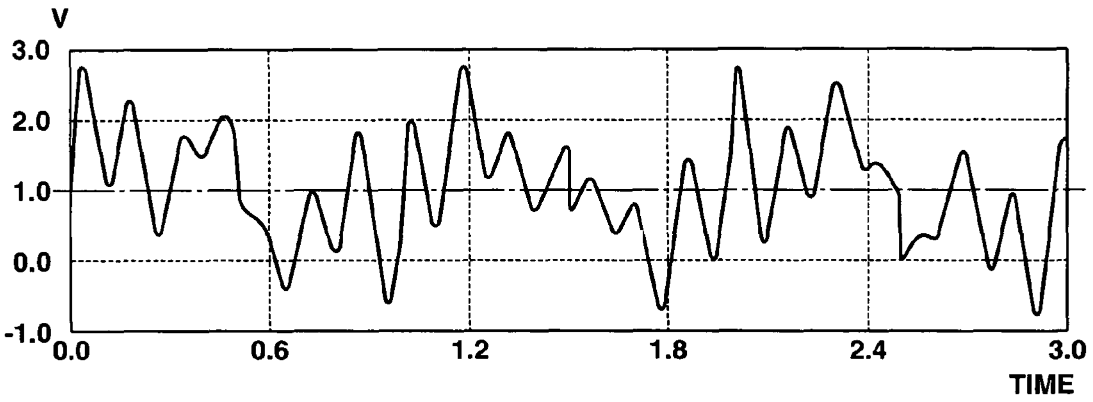
FIGS. 7A and 7B show waveforms of a detected signal containing a considerable noise and an ideal noiseless data pulse, respectively.
Figure 7B:
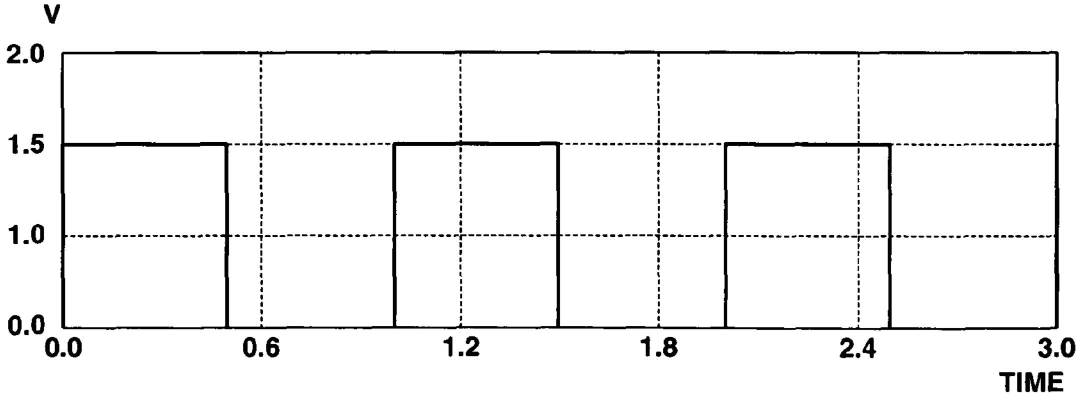

Then, examples of simulation of determination of data pulses from a detected signal which contains considerable noises will be described. FIGS. 7A and 7B illustrate examples of a waveform of a detected signal containing considerable noises and that of an ideal noiseless data pulse, respectively. FIGS. 8-10 respectively show a data chart indicative of the result of simulation of determination of “1”, “0” and P signals containing considerable noises based on the respective correlation value calculations. The waveform of FIG. 7A shows data pulses representing a “1” signal and containing pseudo noises of sinusoidal waves of 2.7, 6.1 and 7.1 Hz. The data pulses have an amplitude of 1.0 Vpp (or a peak-to-peak voltage of 1 V) and the noises of those frequencies have an amplitude of 1.0 Vpp (or a peak-to-peak voltage of 1.0 V).

Obviously, it is difficult to obtain a signal of FIG. 7B even by processing and correcting, in various manner, data which is obtained by binarizing the signal of FIG. 7A with a central voltage of 1.0 V as a threshold. However, when the determining method using the correlation value calculation expressions of Table 4 were applied to the signal of FIG. 7A, a result of simulation of FIG. 8 was obtained. More particularly, three kinds of correlation value calculations of Table 4 were performed on sampled data of the signal obtained at time points in a time duration of 0 (second synchronization point) to 0.9 seconds. As a result, then, it was found that a correlation value F1 for the "1" signal was greater than the correlation values FP and F0 for the P and "0" signals, respectively, and the data pulse received or involved was determined as the "1" signal. In addition, for the signal values at time points in each of time durations of 1.0-1.9, 1.1-2.9 and 2.1-3.9 seconds, it was found that the correlation value F1 for the "1" signal was maximum and the data pulse received or involved was determined as the "1" signal.

When a similar data pulse determining simulation was made on a detected signal which included an ideal "0" signal waveform and considerable noises similar to the above, a result shown in FIG. 9 was obtained. Further, when a similar simulation was made on a detected signal which includes an ideal "P" signal waveform and considerable noises similar to the above, a result shown in FIG. 10 was obtained. Thus, in these cases, the respective original "0" and "P" signals before containing noises were determined as received or involved.

FIGS. 11-13 show the results of simulation of determining the "1", "0" and P signals which contain noises, using corresponding limiters.

Although not described in the above correlation value calculations, a limiter may be provided which when the sampled values of the detected signal are abnormally large or small due to reception of some sudden abnormally large radio waves, limits an upper or lower value of the sampled values of the detected signal to reduce an influence of such signal on the data pulse determination. The functions of the limiter may be implemented by a calculation process of the CPU 20 or an upper and a lower limit value may be set on the A/D converter 16.

For example, when a plurality of noises of a regular level are added, thereby exceeding an upper or lower limit value, the limiter also serves to limit those noises to the limit value. Thus, the noise averaging operation can be undone. However, if the noises are of an extent shown in FIG. 7A, the received data pulse is determined correctly by setting appropriate upper and lower limit values to the limiter. For example, as shown in the results of simulations of FIG. 11-13, when the upper and lower limit values of the limiter are set to 2.0 and 0.0 volts, respectively, the "1", "0" or "P" signal included in the detected signal is determined accurately by comparing the correlation values calculated.

As described above, according to the radio controlled watch 1 and time information receiver of the embodiment, the values of the detected signal are sampled by the A/D converter 16 and correlation values for the possible data pulses to be determined are calculated based on the sampled data. Thus, even when the detected signal includes considerable noises, the received data pulse is determined accurately based on the correlation values calculated. Obviously, for example, if the detected signal of FIG. 7A is binarized and corrected in various manners, no traces of the original data pulses contained in the detected signal would remain and the data pulse cannot be determined correctly. However, according to the determining method of this embodiment, the data pulse is accurately determined even from the binarized detected signal.

According to the time information receiver of this embodiment, respective correlation value calculations for possible different data pulses to be determined are performed and resulting correlation values are compared to determine the respective data pulses. Thus, the data determination is made more accurately. In addition, as shown in the second and third groups of correlation value calculation methods, when all the data pulses to be determined are high or low throughout a specified part of a unit period, their sampled values may be replaced with a fixed high or low value, thereby calculating the correlation values. Thus, the number of A/D conversions and the number of steps for calculation are reduced and hence a data determination load is reduced. In addition, an influence of possible noise on determination of the data pulse is eliminated, thereby improving the data extraction accuracy.

Second Embodiment

Figure 14:
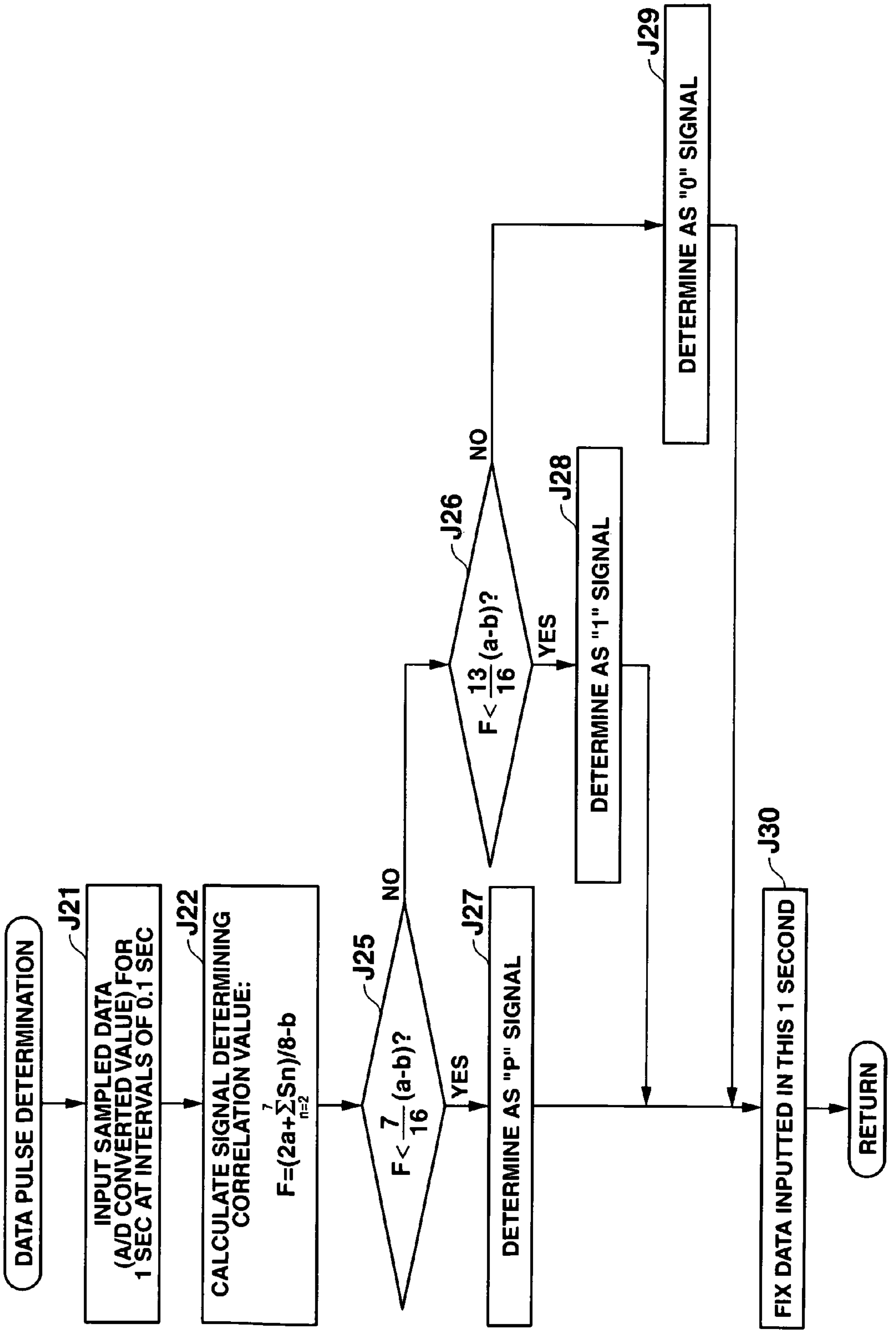
FIG. 14 illustrates a flowchart of a data pulse determining process which will be performed in a second embodiment of the present invention.

Referring to FIG. 14, a data pulse determining process of a second embodiment is shown. This process is the same composition as the process of the first embodiment excluding that a single correlation value is calculated to determine which of different data pulses (P, "0" and "1" signals) is received and further description of the other processing operations will be omitted.

As the correlation value calculation expression, that for the "0" signal of Table 4, for example, may be used. According to this expression, with an ideal signal waveform, a correlation value F varies depending on a data pulse concerned: that is, a correlation value F=a−b for the "0" signal; F=5(a−b)/8 for the "1" signal; and F=2(a−b)/8 for the "P" signal. Thus, which of the "0", "1" and "P" signals was received can be determined from the magnifications of those correlation values F. As shown in FIG. 14, in this data pulse determining process, only one kind of correlation value calculation shown by step J22 is performed and a resulting magnification of the correlation value F is determined (steps J25, J26), thereby determining which of the "P", "1" and "0" signals is received (steps J27-J29). Therefore, according to this time information receiver, the received data pulse is determined, using one kind of correlation value calculation. Thus, although the precision of the data pulse determination is somewhat less than those in the previous embodiments, the load to be processed in the time code detection process is reduced.

Third Embodiment

Figure 15:
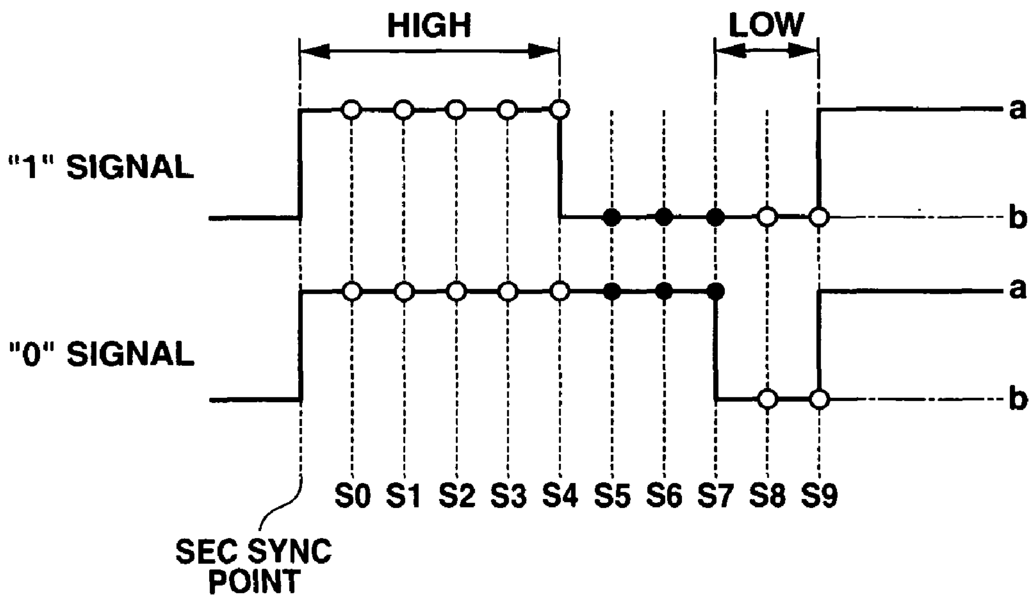
FIG. 15 illustrates the features of a method of calculating a correlation value for a data pulse in a third embodiment of the present invention.
Figure 16:
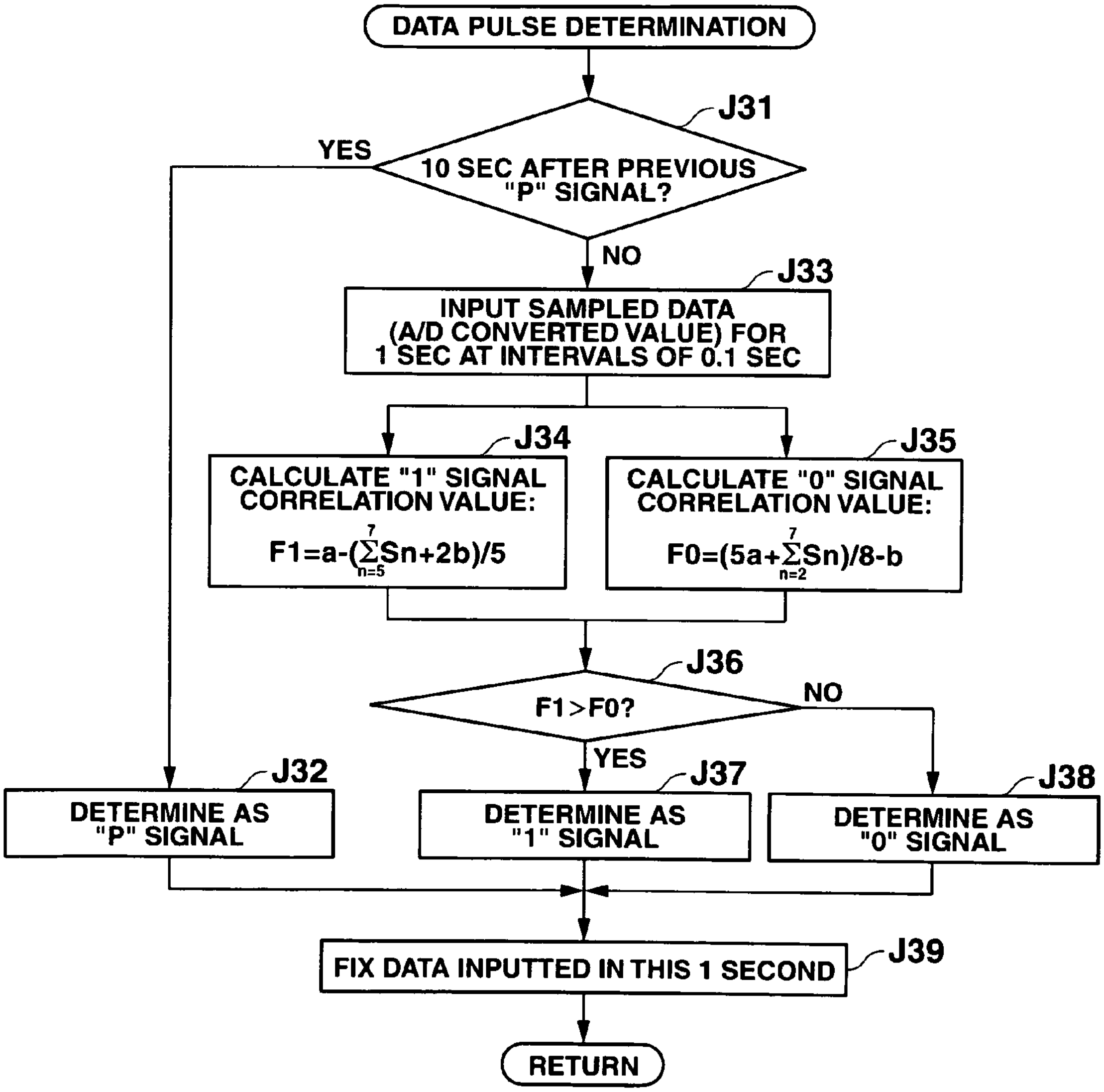
FIG. 16 illustrates a flowchart of a data pulse determining process which will be performed in the third embodiment of the present invention.

FIG. 15 illustrates the features of a correlation value calculation method according to the third embodiment. FIG. 16 is a flowchart indicative of a data pulse determining process to be performed in the third embodiment. In the third embodiment, since a time when a "P" signal is received is known, the "P" signal is determined instantly when received, and which of the "0" and "1" signals was received is only determined from the detected signal. It is known that two successive "P" signals each are sent at a respective one of an end and a start of a frame of the time code and that further "P" signals are sent at intervals of 10 seconds from the "P" signal indicative of the end of the frame. Thus, at the start of the data pulse determining process, a "P" signal is received and detected and then it is determined which of the "0" and "1" signals was received.

Since in this embodiment only the "1" and "0" signals are determined from the detected signal, percentages of parts of a unit period in the detected signal where both the "1" and "0" pulses, respectively, are high are large. For example, as shown in FIG. 15, both the data pulses are high for a period of 0.5 seconds from the seconds synchronization point, and low for a period part of 0.8 to 1.0 seconds. Thus, when their correlation values are calculated, the values of those signals for these parts of the unit period are replaced with respective ideal high and low level values of corresponding ideal data pulses. In this embodiment, when the operation goes to the data pulse determining process, it is determined whether a current time is one of times when "P" signals are received, which occur at the intervals of 1.0 seconds (step J31). If so, the received data is determined as the "P" signal, thereby being fixed as such (step J32, J39). If not, sampled data for one second is received to determine whether the received pulse data is a "1" or "0" signal (step J33).

Then, correlation values F1 and F0 for the "1" and "0" signals, respectively, are calculated by using the sampled data (steps J34, J35). Here, the calculation methods for correlation value F0 and F1 for the "0" and "1" signals, respectively, of Table 2 are employed. Further, in these calculations, the sampled data of the "0" and "1" signals which are both high throughout for 0-0.5 seconds of the unit period and the sampled data of the "0" and "1" signals which are both low throughout for 0.8-1.0 seconds of the unit period are replaced with high and low level values "a" and "b", respectively, of a corresponding ideal waveform. Then, by comparison of the correlation value F1 and F0 obtained by the calculations (step J36), a data pulse for the larger correlation value is determined as received (steps J37, J38). Then, the determined data is fixed as such (step J39). Thus, the subroutine is terminated and the operation returns to the original routine.

According to this embodiment, the "P" signal is determined by reception of the standard signal, and only the "0" and "1" signals are determined from the detected signal. Thus, possible useless calculations are eliminated and hence a calculation load to be processed is reduced. In the correlation value calculations to determine the "0" and "1" signals, the sampled data values of both these signals high or low in the parts of the unit periods are replaced with fixed high and low values, respectively. Thus, during these parts of the unit periods, the data sampling by the A/D converter 16 can be stopped to reduce the power consumption and the load to be processed. Further, an influence of possible noise on the correlation value calculations during these parts of the unit period is reduced, thereby achieving data pulse determination with high accuracy.

The present invention is not limited to the first-third embodiments. For example, while in the above embodiments the detected signal is illustrated as sampled by the A/D converter 16 at the sampling rate of 10 times per second, the sampling rate may be 5-30 times per second. When the sampling rate of 10 times per second is employed, it would occur that several sampling times coincide with some of time points where the data pulses fall. Thus, the data values obtained at these sampling times could be indefinite, thereby rendering the data determination unsettled. However, by employing a sampling rate of 12 or 8 times per second, the times when the data is sampled shift from the time points when the data pulses fall, and the respective data values are handled as more fixed.

Figure 17:
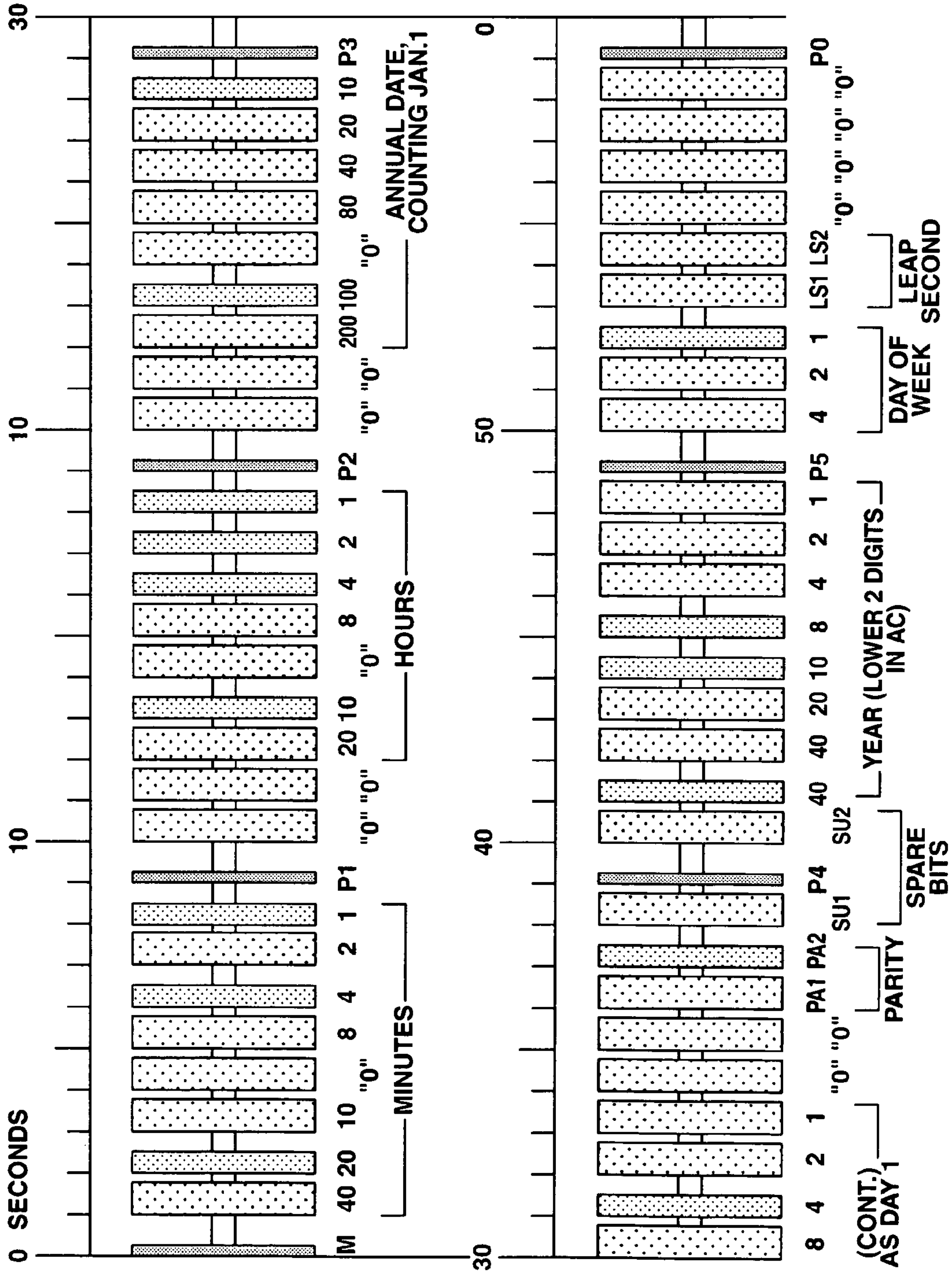
FIG. 17 illustrates a format of a time code included in a Japanese standard time and frequency signal.
Figure 18A:
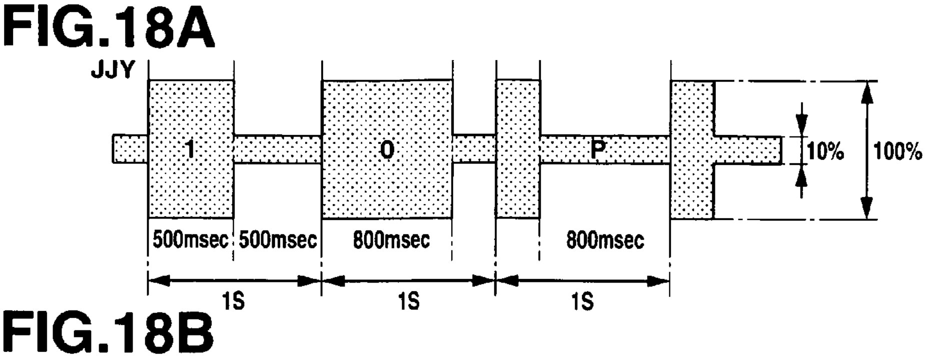
FIGS. 18A, 18B, 18C, 18D, and 18E illustrate formats of data pulses composing standard time and frequency signals now in use in several counties in the world.
Figure 18B:
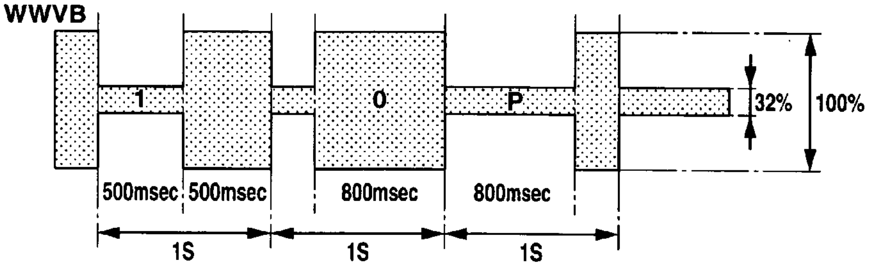
Figure 18C:
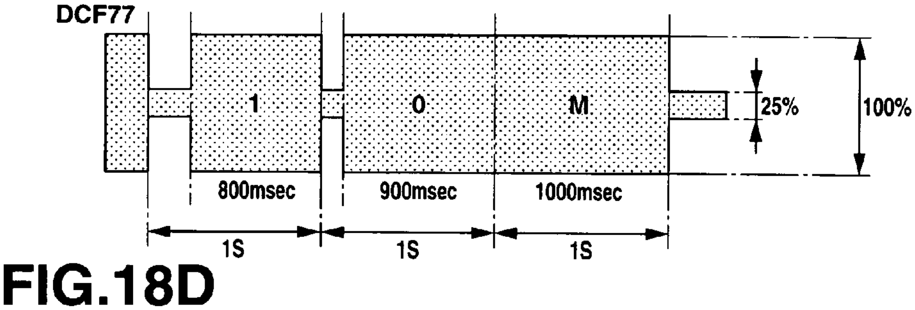
Figure 18D:
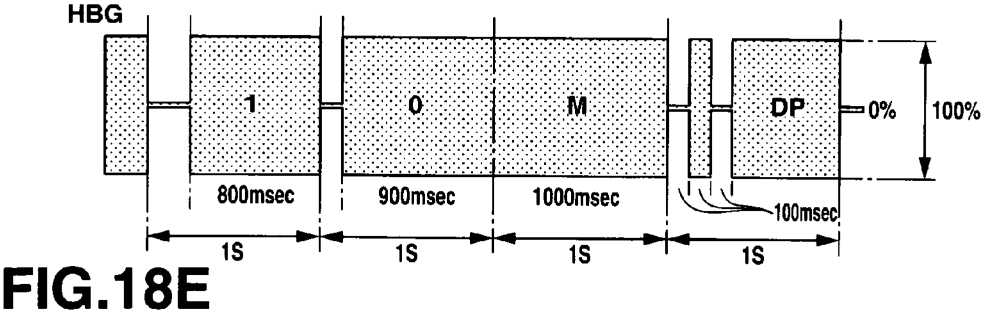
Figure 18E:
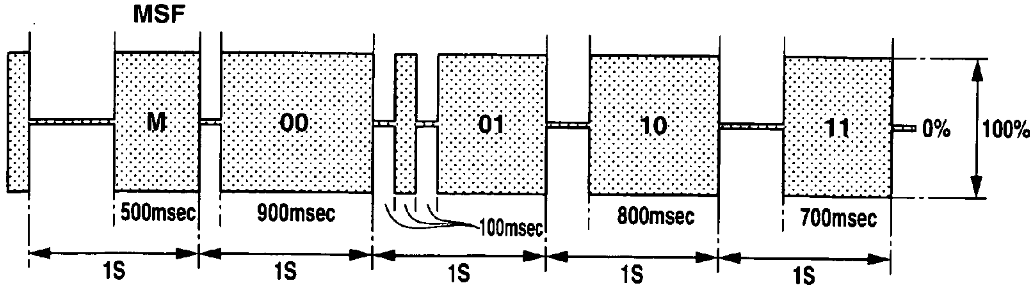

While in the above embodiments the methods of calculating correlation values corresponding to the Japanese standard time and frequency signal (see FIGS. 17 and 18A) have been illustrated, similar correlation values corresponding to the respective data pulses included in the standard time and frequency signals used in USA, Germany, Switzerland, and Great Britain shown in FIGS. 18B-18E, respectively, can be calculated. The data pulses of the standard signals used in these countries have waveforms in which the data pulses each will fall at a start point, or seconds synchronization point, in a unit period. Furthermore, the respective data pulses vary in width or pattern from country to country. However, by taking differences each between sampled data before and after a time point where each data pulse in an ideal waveform rises from low to high or by taking a difference between a composite value of high sampled data in a part of a unit period and a composite value of low sampled data in a part of the unit period, and then calculating correlation values from these differences, data pulse determination can be achieved.

While in the above embodiment the time information receivers have been illustrated as mounted on the radio controlled watches, these embodiments are not limitative. For example, the time information receivers may be mounted on other various devices to receive a time code of the standard time and frequency signal or may be constituted as an independent one.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2007-079830 filed on Mar. 26, 2007 and including specification, claims, drawings and summary. The disclosure of the above Japanese patent application is incorporated herein by reference in its entirety.

What is claimed is:

1. A time information receiver which receives a time code in which a plurality of different data pulses identified by width or pattern are arranged in respective unit periods of the time code, the time information receiver comprising:

a sampler that samples a detected signal of the time code at intervals of time shorter than the unit period with respect to a synchronization point in the unit period;

calculating means for calculating a respective correlation value for each of the plurality of data pulses of the detected signal based on the sampled data obtained from the sampler; and a determiner that determines a type of data pulse of the detected signal corresponding to a maximum correlation value among the correlation values calculated by the calculating means;

wherein when one of the plurality of data pulses has an ideal pulse waveform, the calculating means takes, as the correlation value for the one of the data pulses, a difference between a single sampled value, or a composite value of a plurality of sampled data values, of the one of data pulses immediately before a time point where the one of data pulses rises or falls and a single sampled value, or a composite value of a plurality of sampled data values, of the one of data pulses immediately after the time point.

2. A time information receiver which receives a time code in which a plurality of different data pulses identified by width or pattern are arranged in respective unit periods of the time code, the time information receiver comprising:

a sampler that samples a detected signal of the time code at intervals of time shorter than the unit period with respect to a synchronization point in the unit period;

calculating means for calculating a respective correlation value for each of the plurality of data pulses of the detected signal based on the sampled data obtained from the sampler; and a determiner that determines a type of data pulse of the detected signal corresponding to a maximum correlation value among the correlation values calculated by the calculating means;

wherein when one of the data pulses has an ideal pulse waveform, the calculating means takes, as the correlation value for the one of data pulses, a difference in a composite value of sampled data of the one of data pulses which is high throughout a part of a unit period of the time code and a composite value of sampled data of the one of data pulses which is low throughout a part of the unit period.

3. The time information receiver of claim 1, wherein when all the data pulses have an ideal pulse waveform and are high or low together throughout a part of a unit period, the calculating means calculates the correlation value for a respective one of the data pulses by replacing the sampled data of the respective one of the data pulses throughout the part of the unit period with a corresponding fixed value.

4. The time information receiver of claim 3, wherein:

the calculating means and the determiner restrict the data pulses to be determined to “1” and “0” signals for a time period from a time when a “P” signal contained in the time code is received to a time when a next “P” signal is received in the time code; and the calculating means replaces sampled data of each of the data pulses for the “1” and “0” signals for 0.5 seconds from a start point of the unit period with a high fixed level value, and replaces each of the sampled data for 0.8 to 1.0 second of the unit period with a fixed low level value, and then calculates the correlation values.

5. The time information receiver of claim 1, wherein when the value of the detected signal exceeds an upper or lower limit, the sampler or the calculating means restricts the sampled data values of the data pulses to the upper or lower limit.

6. A radio controlled watch comprising:

the time information receiver of claim 1;

a timepiece that keeps time; and a timepiece controller that recovers the time code based on the data pulses which are determined by the time information receiver and corrects the time kept by the timepiece based on the recovered time code.

7. The time information receiver of claim 2, wherein when all the data pulses have an ideal pulse waveform and are high or low together throughout a part of a unit period, the calculating means calculates the correlation value for a respective one of the data pulses by replacing the sampled data of the respective one of the data pulses throughout the part of the unit period with a corresponding fixed value.

8. The time information receiver of claim 7, wherein:

the calculating means and the determiner restrict the data pulses to be determined to “1” and “0” signals for a time period from a time when a “P” signal contained in the time code is received to a time when a next “P” signal is received in the time code; and the calculating means replaces sampled data of each of the data pulses for the “1” and “0” signals for 0.5 seconds from a start point of the unit period with a high fixed level value, and replaces each of the sampled data for 0.8 to 1.0 second of the unit period with a fixed low level value, and then calculates the correlation values.

9. The time information receiver of claim 2, wherein when the value of the detected signal exceeds an upper or lower limit, the sampler or the calculating means restricts the sampled data values of the data pulses to the upper or lower limit.

10. A radio controlled watch comprising:

the time information receiver of claim 2;

a timepiece that keeps time; and a timepiece controller that recovers the time code based on the data pulses which are determined by the time information receiver and corrects the time kept by the timepiece based on the recovered time code.

* * * * *